United States Patent
Walker et al.

(10) Patent No.: US 8,998,156 B2
(45) Date of Patent: Apr. 7, 2015

(54) FASCIA MOUNTING BRACKET ASSEMBLY

(71) Applicant: Peak Innovations Inc., Richmond, CA (US)

(72) Inventors: Simon Walker, Delta (CA); Hou Jun (Frank) Fan, Surrey (CA)

(73) Assignee: Peak Innovations Inc., Richmond (CA)

( * ) Notice: Subject to any disclaimer, the term of this patent is extended or adjusted under 35 U.S.C. 154(b) by 9 days.

(21) Appl. No.: 13/768,931

(22) Filed: Feb. 15, 2013

(65) Prior Publication Data
US 2014/0054428 A1    Feb. 27, 2014

(30) Foreign Application Priority Data
Jul. 19, 2012  (CA) .................................... 2783329

(51) Int. Cl.
*F16M 13/00* (2006.01)
*E04F 11/18* (2006.01)
*F16B 9/02* (2006.01)

(52) U.S. Cl.
CPC ............. *E04F 11/1812* (2013.01); *F16B 9/026* (2013.01)

(58) Field of Classification Search
CPC ......................... E04H 12/2215; E04H 12/2269
USPC ................... 248/218.4, 534, 536, 539, 220.1
See application file for complete search history.

(56) References Cited

U.S. PATENT DOCUMENTS

| | | | | |
|---|---|---|---|---|
| 28,958 A | * | 7/1860 | Blood | 52/165 |
| 844,726 A | * | 2/1907 | Hunter | 111/99 |
| 3,615,110 A | * | 10/1971 | Fugate | 403/230 |
| 4,271,646 A | * | 6/1981 | Mills | 52/165 |
| 4,359,851 A | | 11/1982 | Daniels | |
| 4,588,157 A | * | 5/1986 | Mills | 248/545 |
| 4,644,713 A | * | 2/1987 | Lehman | 52/165 |
| 4,689,889 A | * | 9/1987 | Reeves | 33/408 |
| 5,090,656 A | * | 2/1992 | Brown | 248/545 |
| 5,203,817 A | * | 4/1993 | Klumpjan | 52/298 |
| 5,632,464 A | * | 5/1997 | Aberle | 248/530 |
| 5,661,946 A | * | 9/1997 | Davis | 52/849 |
| 5,771,646 A | * | 6/1998 | DeSouza | 52/263 |
| D430,789 S | * | 9/2000 | Opperman | D8/363 |
| 6,328,285 B1 | * | 12/2001 | Wiseman | 256/59 |
| 6,340,147 B1 | * | 1/2002 | Dymarczyk | 248/530 |
| 6,719,481 B2 | * | 4/2004 | Hoffmann | 403/403 |
| 6,817,157 B2 | * | 11/2004 | Bourque | 52/712 |

(Continued)

OTHER PUBLICATIONS

2011 Probuilt Catalogue & Price List.

(Continued)

*Primary Examiner* — Terrell McKinnon
*Assistant Examiner* — Daniel Breslin
(74) *Attorney, Agent, or Firm* — Smiths IP

(57) ABSTRACT

A bracket for attaching a post to one or more fascia boards is provided. In one embodiment, the bracket comprises a flat top surface with openings sized to receive fasteners for attachment to the post. A back surface comprises openings sized to receive fasteners for attachment to the fascia boards. Two flanges extend substantially perpendicularly to both the top surface and the back surface. A cover is releasably attachable to the flanges. In another embodiment, the bracket comprises a top surface, a plurality of walls extending down from the top surface, and a plurality of angled faces extending from an edge of the walls. The top surface, the walls, and the angled faces form a semi-enclosed space.

23 Claims, 8 Drawing Sheets

(56) References Cited

U.S. PATENT DOCUMENTS

| | | | |
|---|---|---|---|
| 6,886,296 B1 * | 5/2005 | John et al. | 52/170 |
| 7,627,995 B1 * | 12/2009 | Yoder | 52/170 |
| D610,717 S * | 2/2010 | Lin | D25/133 |
| 7,730,675 B2 * | 6/2010 | Hill | 52/153 |
| 7,740,220 B2 * | 6/2010 | Jeanveau | 248/534 |
| 8,082,702 B2 * | 12/2011 | Hill | 52/155 |
| 8,769,887 B2 * | 7/2014 | Proffitt, Jr. | 52/167.3 |
| 2005/0098772 A1 * | 5/2005 | Fuoco | 256/65.14 |
| 2013/0175488 A1 * | 7/2013 | Burt et al. | 256/65.04 |

OTHER PUBLICATIONS

2012 Probuilt Canadian Market Catalogue.
Century Aluminum Railings—Fascia Bracket & Post Installation Guide, dated Apr. 2010.

* cited by examiner

FASCIA MOUNTING BRACKET ASSEMBLY

FIELD OF THE INVENTION

The present invention relates to bracket assemblies mounted onto fascia boards. In particular, the present invention relates to bracket assemblies mounted onto fascia boards for use in building decks.

BACKGROUND OF THE INVENTION

Exterior decks are commonly found connected to a building. Decks, and especially those connected to residential homes, are commonly made of wood. They typically have a flat surface and are often elevated from the ground. A fascia board may be present either on the edge or below the surface of a deck and may run horizontally along a substantial portion of the perimeter of the deck. For safety purposes, the deck may also be fully or partially enclosed by railing. The railing is typically supported by a number of spaced posts that are attached to the deck. The railing and posts are also commonly made of wood.

One method of attaching the posts to the deck is to attach the bases of the posts to the face of the fascia board through a metal bracket. For attachment of posts that are along the sides of the deck, such a bracket typically has a horizontal flat surface (for attachment of the bases of the posts) and a vertical flat surface (for attachment to the face of the fascia board). For attachment of posts that are at the corners of the deck, such a bracket typically has a horizontal flat surface (again for attachment of the bases of the posts) and a vertical L-shaped surface. This vertical L-shaped surface allows the bracket to be attached to the two adjoining faces of the fascia board that make up the corner of the deck. Actual attachment of the bracket to the posts and fascia board is typically accomplished using wood screws.

However, conventional metal brackets suffer from a number of shortcomings. As the brackets are typically exposed to the elements (such as rain or snow), corrosion near the area of attachment of the wood screws to the metal brackets may occur. This could result in failure of the attachment and consequently, unexpected detachment of the post from the fascia board. There is therefore a need for a bracket that may effectively connect a deck post to the face of a fascia board while at the same time, resisting the effects of the elements.

SUMMARY OF THE INVENTION

In one aspect of the invention, a bracket for attaching a post to one more fascia boards comprises a substantially flat top surface, a substantially flat back surface oriented substantially perpendicular to the top surface, two flanges extending substantially perpendicularly to both the top surface and the back surface, and a cover releasably attachable to the flanges. The top surface comprises one or more first openings sized to receive first fasteners for attachment to the post. The back surface comprises one or more second openings sized to receive second fasteners for attachment to the fascia boards.

In another aspect of the invention, the cover comprises a cover surface and two cover flanges extending substantially perpendicularly to the cover surface. Each of the cover flanges comprises one or more indentations and each of the flanges comprises one more cavities for accepting the indentations.

In yet another aspect of the invention, the cavities are holes.

In a further aspect of the invention, when the cover is attached to the flanges, access to the second openings is blocked.

In still another aspect of the invention, each of the flanges comprises an angled edge.

In a further aspect of the invention, the flanges and the top surface are formed from a single sheet of material.

In another aspect of the invention, a bracket for attaching a post to one or more fascia boards comprises a substantially flat top surface, two substantially flat wings oriented substantially perpendicularly to each other, a plurality of walls extending substantially perpendicularly from the top surface, and a plurality of angled faces. The top surface comprises one or more first openings sized to receive first fasteners for attachment to the post. Each of the wings comprises one or more second openings sized to receive second fasteners for attachment to the fascia boards. The wings are attached at a junction of two the walls, and the top surface, the walls, and the angled faces form a semi-enclosed space.

In still another aspect of the invention, the bracket further comprises a cover releasably attachable to the walls. The cover comprises a cover surface and two cover flanges extending substantially perpendicularly to the cover surface. Each of the cover flanges comprises one or more indentations, and the walls comprise one or more cavities for accepting the indentations.

In a further aspect of the invention, the cavities are holes.

In a still further aspect of the invention, when the cover is attached to the walls, access to the first openings is blocked.

In still another aspect of the invention, the bracket further comprises two wing covers. The wing covers are releasably attachable to the wings. Each of the wing covers comprises a wing cover surface and a plurality of wing cover flanges extending substantially perpendicularly to the wing cover surface. When the wing covers are attached to the wings, access to the second openings is blocked.

In a further aspect of the invention, the second openings in one of the wings are offset in relative position from those the second openings in another of the wings, such that when second fasteners are received in said second openings of both of the wings, the second fasteners do not interfere with each other.

In another aspect of the invention, the plurality of walls is three walls.

In still another aspect of the invention, the plurality of angled faces is two angled faces.

In yet another aspect of the invention, two of the walls comprise an angled edge.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The embodiments of the invention will be described by reference to the drawings thereof in which.

DETAILED DESCRIPTION

Figure 1:
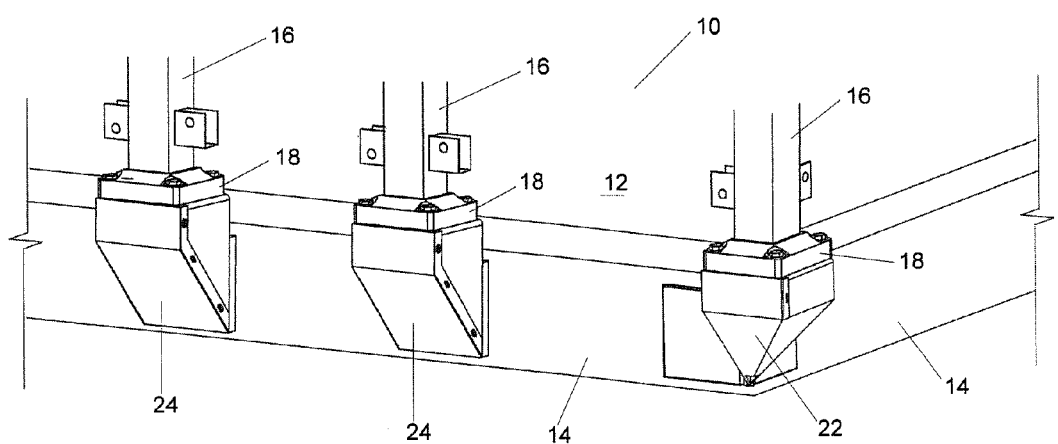
FIG. 1 shows the bracket assemblies of the present invention as used with a deck.

Referring to FIG. 1, a deck 10 comprises a deck surface 12. Around the edge of the deck surface 12 are one or more fascia boards 14. The fascia boards 14 typically form a border around at least a portion of the deck surface 12 and may comprise a flat length of wood extending perpendicularly downward from the edge of the deck surface 12. The deck 10 further comprises one or more deck posts 16 arranged along the perimeter of the deck surface 12. The deck posts 16 are typically elongated members that extend vertically, with a post base 18 on one end of each deck post 16. The post base 18 comprises a plurality of post base holes 20.

Figure 6:
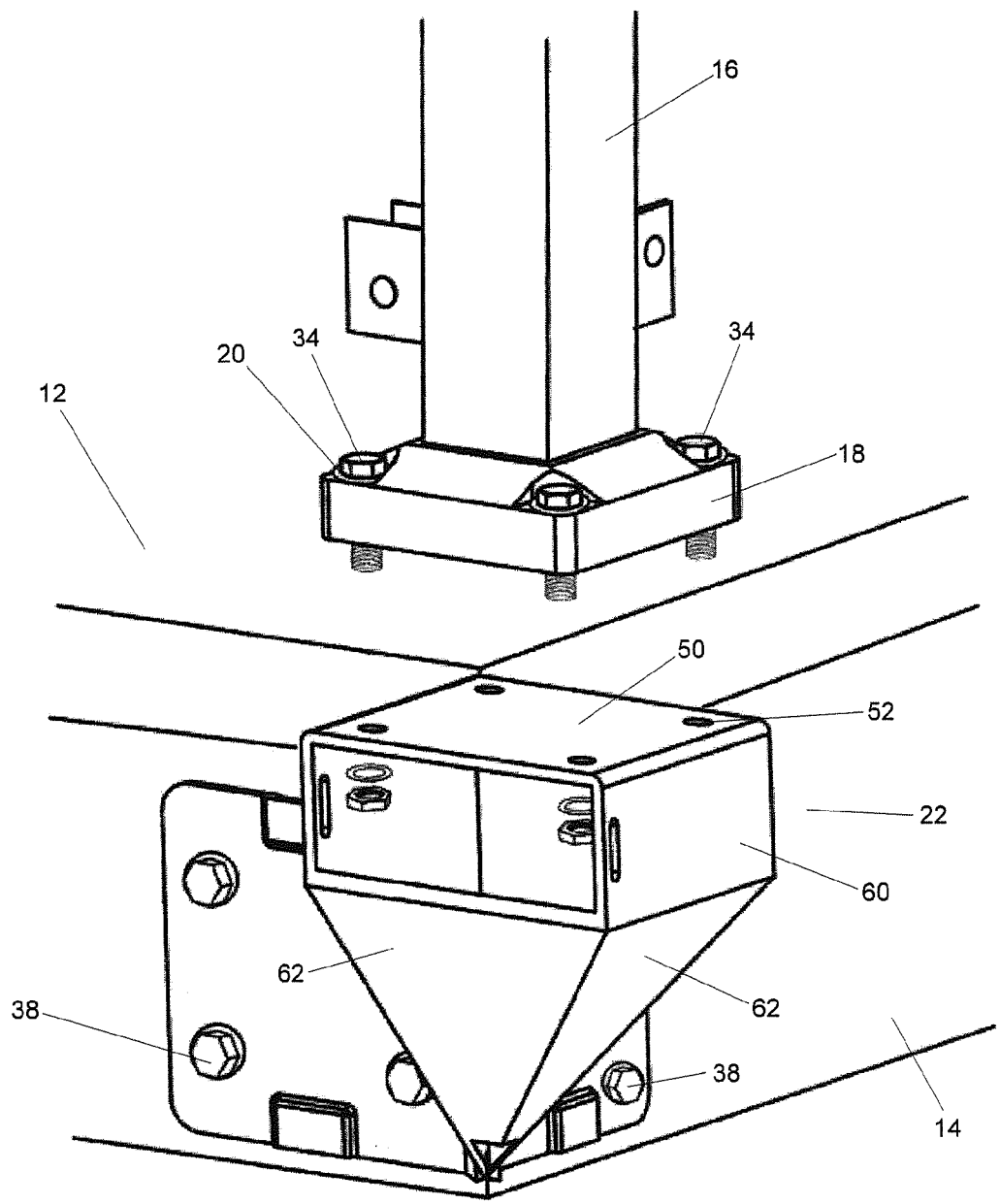
FIG. 6 shows an exploded view of the corner bracket, with the covers, as used with the deck.
Figure 7:
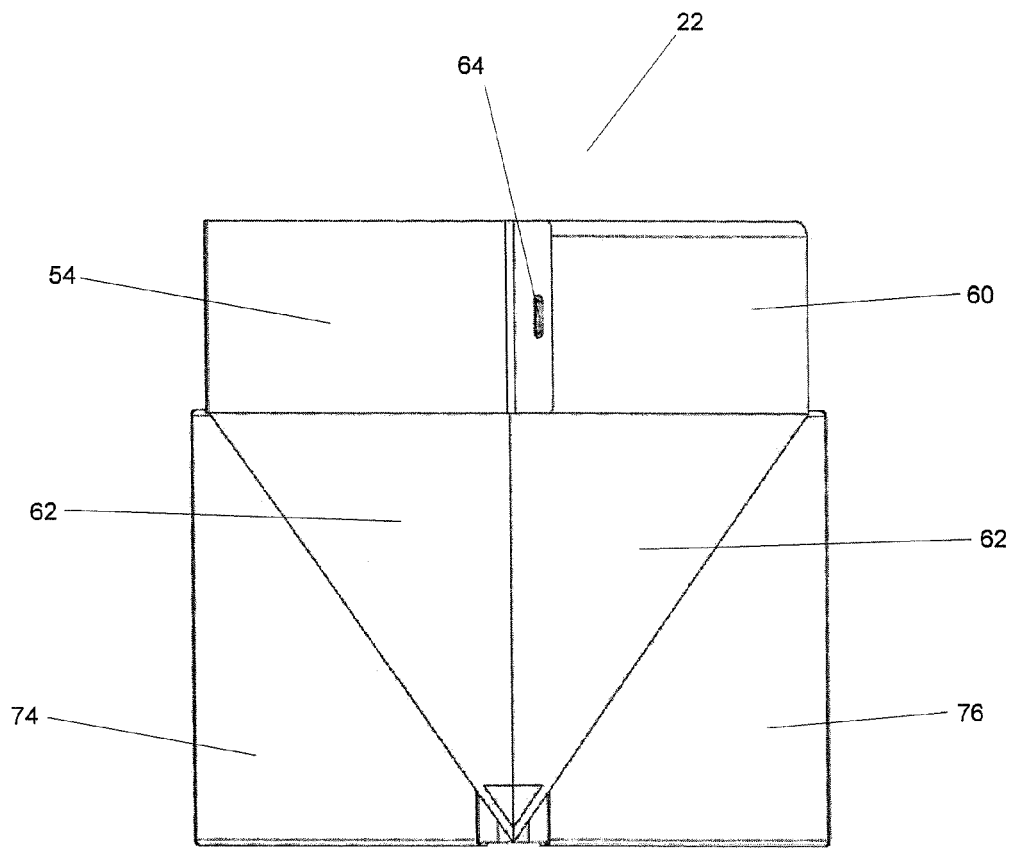
FIG. 7 shows a front view of the corner bracket, with the wing covers.

Referring to FIG. 1, the deck posts 16 are connected to the fascia boards 14 through corner brackets 22 and side brackets 24. The corner brackets 22 attach the deck post 16 at a corner of the deck 10. As a result, the corner brackets 22 attach a single deck post 16 to the faces of two fascia boards 14 that meet at the corner of the deck surface 12, as shown in FIG. 6. In comparison, the side brackets 24 attach the deck post 16 to a side of the deck 10. Consequently, the side brackets 24 attach a single deck post 16 to the face of the fascia board 14 along the side of the deck surface 12, as shown in FIGS. 2 and 3.

Figure 2:
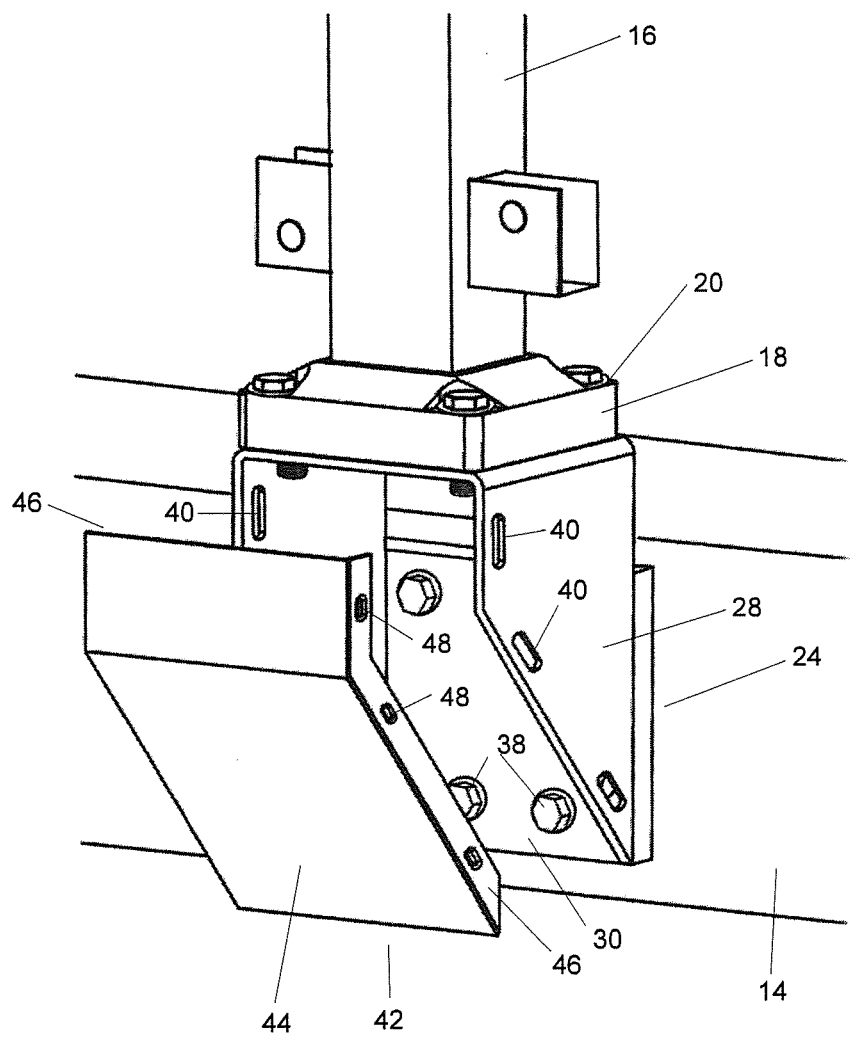
FIG. 2 shows the side bracket of the present invention, with the cover removed, as used with the deck.
Figure 3:
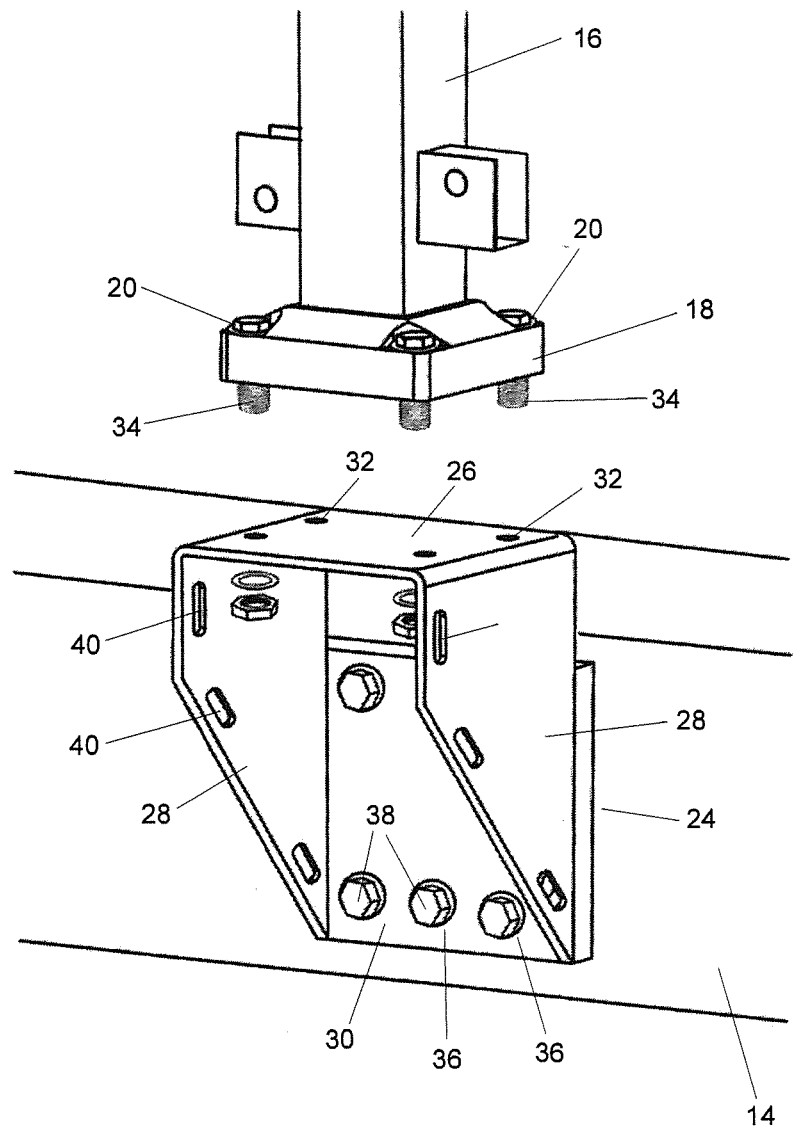
FIG. 3 shows an exploded view of the side bracket, without the cover, as used with the deck.

Referring to FIGS. 2 and 3, the side bracket 24 comprises a side bracket top surface 26, two side bracket flanges 28, and a side bracket back surface 30. In one embodiment, the side bracket top surface 26 lies substantially flat in the horizontal plane and comprises a plurality of side bracket top holes 32 (seen in FIG. 3). The side bracket top holes 32 align with the post base holes 20 in the post base 18 such that the post base 18 may be attached to the side bracket top surface 26 by using one or more post fasteners 34. The post fasteners 34 may include threaded fasteners (such as screws) or other mechanical fasteners. The side bracket top surface 26 provides a substantially flat and horizontal base for the placement and attachment of the deck post 16.

The side bracket flanges 28 extend substantially perpendicularly below the side bracket top surface 26. In one embodiment, the side bracket flanges 28 and the side bracket top surface 26 are formed from a single piece of material, with it being bent at right angles at two locations to form the side bracket flanges 28 and the side bracket top surface 26. The side bracket flanges 28 may be tapered at the bottom, as shown in FIG. 2.

The side bracket back surface 30 lies substantially flat in the vertical plane and is attached to an edge of each of the side bracket flanges 28. This attachment may be made by welding or by some other appropriate permanent attachment mechanism. The side bracket back surface 30 comprises a plurality of side bracket back holes 36, which may be used to securely attach the side bracket back surface 30 to the fascia board 14 using a plurality of fascia board fasteners 38. The fascia board fasteners 38 may include screws, lug bolts, or the like.

The side bracket flanges 28 comprise one or more inward side bracket cavities 40 located slightly inward from a second edge of each of the side bracket flanges 32 (i.e. the edge opposite that which is attached to the side bracket back surface 30). As shown in FIG. 2, the side bracket cavities 40 provide a mechanism for a side cover 42 to be removably attached to the side bracket 24. The side bracket cavities 40 are preferably holes (that pass through the side bracket flanges 28) but may also be indentations formed on the side bracket flanges 28. The side cover 42 fits on the side bracket flanges 28 and generally encloses the front of the side bracket 24. The side cover 42 comprises a side cover surface 44 and two side cover flanges 46 extending substantially perpendicularly to the side cover surface 44. In one embodiment, the side cover surface 44 and the two side cover flanges 46 are formed from a single piece of material, with it being bent at right angles at two locations to form the side cover flanges 46 and the side cover surface 44. The side cover flanges 46 each comprises one or more inward side cover indentations 48 that correspond to the side cavities 40 on the side bracket flanges 28.

When the side cover 42 is pushed against the side bracket 24, the inward side cover indentations 48 will come into contact with the edge of the side bracket flanges 28. Further pressure exerted against the side bracket 24 will cause the side cover flanges 46 to deform apart slightly, with the side cover indentations 48 pushed over the edge of the side bracket flanges 28 and onto the surface of the side bracket flanges 28. However, when the side cover indentations 48 reach the side bracket cavities 40 on the side bracket flanges 28, the side cover indentations 48 will catch onto the side bracket cavities 40 and the side cover flanges 46 will revert back to their original shape. The side cover 42 will be securely held over the side bracket 24. In order to remove the side cover 42, the side cover 42 may be pulled away from the side bracket 24. As the side cover 42 is pulled away, the side cover indentations 48 will come into contact with the interior sides of the side bracket cavities 40. Further outward pressure will cause the side cover flanges 46 to deform apart slightly, allowing the side cover indentations 48 to slide out of the side bracket cavities 40 and onto the surface of the side bracket flanges 46. When the side cover flanges 44 move past the edges of the side bracket flanges 46, the side cover flanges 44 will revert back to their original shape, and the side cover 42 will have detached completely from the side bracket 24.

Referring to FIGS. 4 to 8, the corner bracket 22 comprises a corner bracket top surface 50, which lies substantially flat in the horizontal plane. The corner bracket top surface 50 comprises a plurality of corner bracket top holes 52. The corner bracket top holes 52 align with the post base holes 20 in the post base 18 such that the post base 18 may be attached to the corner bracket top surface 50 by using one or more post fasteners 34. The post fasteners 34 may include threaded fasteners (such as screws) or other mechanical fasteners. The corner bracket top surface 50 provides a substantially flat and horizontal base for the placement and attachment of the deck post 16.

A plurality of surfaces extend substantially perpendicularly to and downward from the corner bracket top surface 50. In the embodiment shown in FIG. 5, the surfaces include a first corner bracket face 56, a second corner bracket face 58, and a third corner bracket face 60. The first corner bracket face 56 and the second corner bracket 58 are attached and extend for substantially the entire height of the corner bracket 22, while the third corner bracket face 60 only extends for a portion of the height of the corner bracket 22. A number of angled surfaces 62 extend angularly from the first, second, and third corner bracket faces 56, 58, 60, forming a generally semi-enclosed space (bounded by the angled surfaces 62, the corner bracket top surface 50, and the first, second, and third corner bracket faces 56, 58, 60) with a corner bracket opening 54. In the embodiment shown in FIG. 5, there are two angled surfaces 62.

Figure 4:
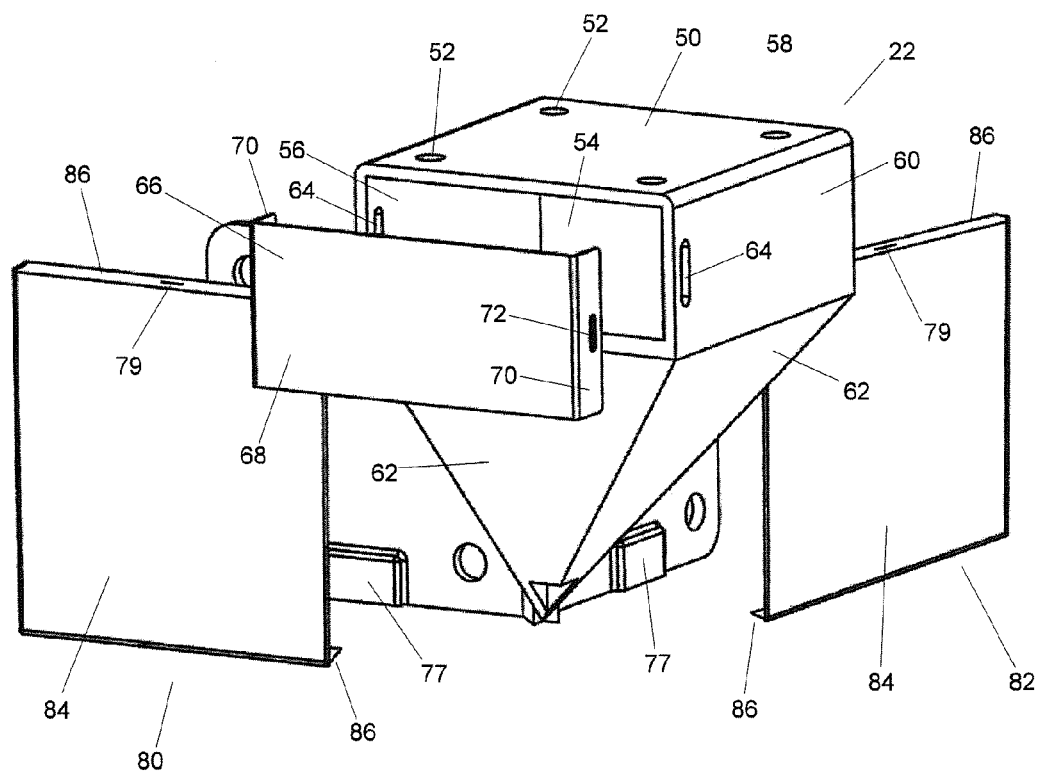
FIG. 4 shows the corner bracket of the present invention with the covers removed.

The first corner bracket face 56 and the third corner bracket face 60 each comprise one or more inward corner bracket cavities 64 located slightly inward from their respective edges adjacent to the corner bracket opening 54. As shown in FIG. 4, the corner bracket cavities 64 provide a mechanism for a corner cover 66 to be removably attached to the corner bracket 22. The corner bracket cavities 64 are preferably holes (that pass through the first and third corner bracket faces 56, 60) but may also be indentations formed on the first and third corner bracket faces 56, 60.

The corner cover 66 fits on the first corner bracket face 56 and the third corner bracket face 60 and provides a covering for the corner bracket opening 54. The corner cover 66 comprises a corner cover surface 68 and two corner cover flanges 70 extending substantially perpendicularly to the corner cover surface 68. In one embodiment, the corner cover surface 68 and the two corner cover flanges 70 are formed from a single piece of material, with it being bent at right angles at two locations to form the corner cover flanges 70 and the corner cover surface 68. The corner cover flanges 70 each comprises one or more inward corner cover indentations 72 that correspond to the corner bracket cavities 64 on the corner bracket 22.

When the corner cover 66 is pushed against the corner bracket 22, the inward corner cover indentations 72 will come into contact with the edges of the first corner bracket surface 56 and the third corner bracket surface 60. Further pressure exerted against the corner bracket 22 will cause the corner cover flanges 70 to deform apart slightly, with the corner cover indentations 72 pushed over the edges of the first corner bracket surface 56 and the third corner bracket surface 60 and onto their surfaces. However, when the corner cover indentations 72 reach the corner bracket cavities 64, the corner cover indentations 72 will catch onto the corner bracket cavities 64 and the corner cover flanges 70 will revert back to their original shape. The corner cover 66 will be securely held over the corner bracket 22. In order to remove the corner cover 66, the corner cover 66 may be pulled away from the corner bracket 22. As the corner cover 66 is pulled away, the corner cover indentations 72 will come into contact with the interior sides of the corner bracket cavities 64. Further outward pressure will cause the corner cover flanges 70 to deform apart slightly, allowing the corner cover indentations 72 to slide out of the corner bracket cavities 64 and onto the surfaces of the first corner bracket face 56 and the third corner bracket face 60. When the corner cover flanges 70 move past the edges of the first corner bracket face 56 and the third corner bracket face 60, the corner cover flanges 70 will revert back to their original shape, and the corner cover 66 will have detached completely from the corner bracket 22.

Figure 5:
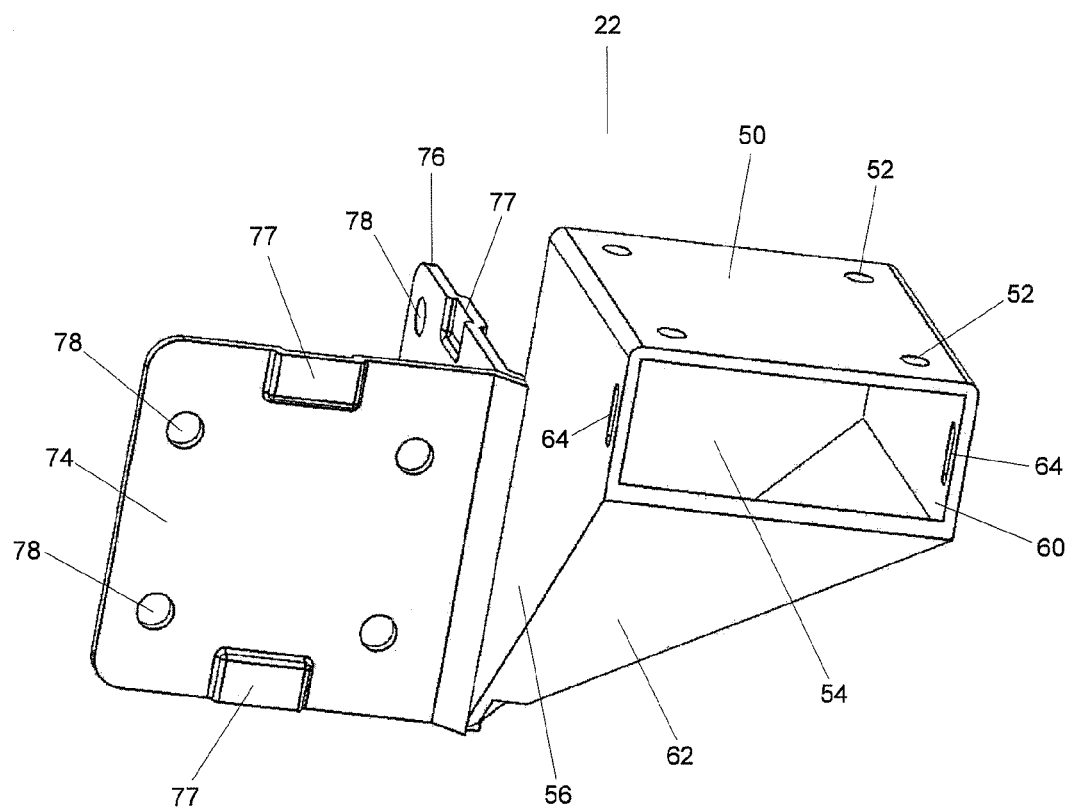
FIG. 5 shows the corner bracket, without the covers.

Referring to FIG. 5, the first and second corner bracket faces 56, 58 meet substantially perpendicularly from one another. Two substantially flat wings, namely first wing 74 and second wing 76 extend from the intersection of the first and second corner bracket faces 56, 58. As a result, the first and second corner bracket faces 56, 58 and the first and second wings 74, 76 form a generally cross-shaped configuration. Each of the first and second wings 74, 76 comprise a number of wing holes 78, which may be used to securely attach the first and second wings 74, 76 to the two fascia boards 14 that make up a corner of the deck 10. This attachment may be made by using a plurality of fascia board fasteners 38, such as screws, lug bolts, or the like.

Figure 8:
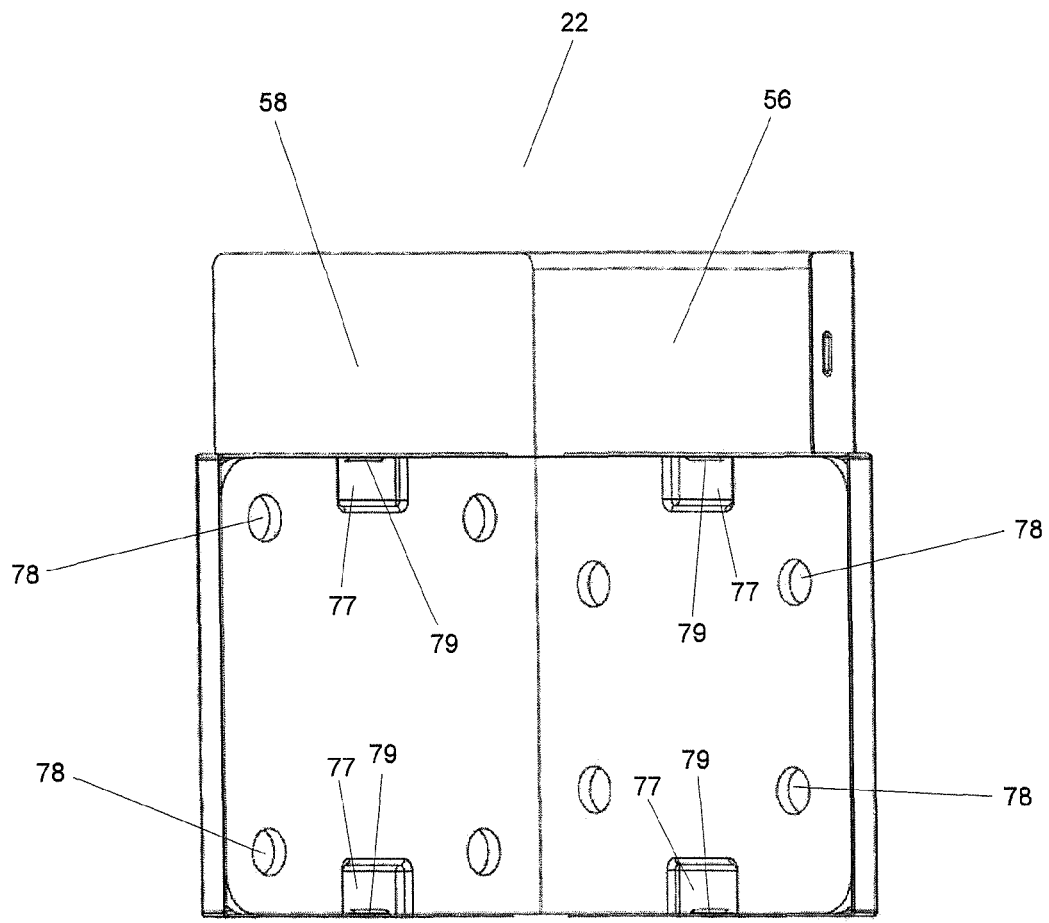
FIG. 8 shows a back view of the corner bracket, with the wing covers.

The location of the wing holes 78 on the first and second wings 74, 76 are placed such that the fascia board fasteners 38 inserted through the first wing 74 do not interfere with the fascia board fasteners 38 inserted through the second wing 76. This may be accomplished by offsetting the relative heights of the wing holes 78 on the first and second wings 74, 76, as best seen in FIG. 8 (e.g. the relative heights of the wing holes 78 on the first wing 74 are different from the relative heights of the wing holes 78 on the second wing 76).

Wing covers, namely first wing cover 80 and second wing cover 82, may be placed over the first and second wings 74, 76. Each of the first and second wing cover 80, 82 comprises a wing cover surface 84 and three wing cover flanges 86. Each of the three wing cover flanges 86 may extend from an edge of the wing cover surface 84. In one embodiment, the wing cover surface 84 and the two wing cover flanges 86 are formed from a single piece of material, with it being stamped to form the wing cover flanges 86 and the wing cover surface 84. The first and second wing covers 80, 82 fit over the first and second wings 74, 76, respectively, with the wing cover flanges 86 sliding over the top and bottom edges of the first and second wings 74, 76. The first and second wing covers 80, 82 may be held in place by friction.

The first and second wings 74, 76 may also comprise one or more protrusions 77 stamped along the edges of the surface of the first and second wings 74, 76. The wing cover flanges 86 may each comprises one or more inward wing cover indentations 79 that correspond to the protrusions 77. When the first and second wing covers 80, 82 are placed on the first and second wings 74, 76, respectively, the wing cover indentations 79 may slide over and around the protrusions 77, securing the wing covers 80, 82 in place, as best seen in FIG. 8.

In one embodiment, the corner bracket 22 and the side bracket 24 are constructed from a metal, such as steel. The side cover 42, the corner cover 66, and the first and second wing covers 80, 82 may be constructed from a metal, such as aluminum.

The corner bracket 22 and the side bracket 24 of the present invention provide a bracket assembly in which all of the fasteners (i.e. the post fasteners 34 and the fascia board fasteners 38) are enclosed and protected from the weather elements. However, the fasteners are still accessible to the user through the use of various removable covers (i.e. the side cover 42, the corner cover 66, and the first and second wing covers 80, 82). Also, the addition of the covers provides additional structural rigidity to the respective bracket assemblies.

The embodiments of the invention have been described in some detail. However, those skilled in the art will appreciate that the scope of the claims should not be limited by the embodiments set forth, but should be given the broadest interpretation consistent with the description as a whole, and that modifications to the constructional details of the embodiments may be practiced within the scope of the claims. The following claims are further to be considered part of the disclosure herein.

The invention claimed is:

1. A bracket for attaching a post to one or more fascia boards, said bracket comprising:
    a substantially flat top surface, said top surface comprising one or more first openings sized to receive first fasteners for attachment to said post;
    a substantially flat back surface oriented substantially perpendicularly to said top surface, said back surface comprising one or more second openings sized to receive second fasteners for attachment to said fascia boards; and two flanges extending substantially perpendicularly to both said top surface and said back surface, wherein each of said flanges comprises:
an outer edge extending between said top surface and said back surface, said outer edge comprising a first edge portion and a second edge portion, wherein said first edge portion is substantially parallel to said back surface, and wherein said second edge portion is angled with respect to said first edge portion and said back surface.

2. The bracket of claim 1, further comprising a cover releasably attachable to said flanges.

3. The bracket of claim 2, wherein said cover comprises a cover surface and two cover flanges extending substantially perpendicularly to said cover surface.

4. The bracket of claim 3, wherein each of said cover flanges comprises one or more indentations and wherein each of said flanges comprises one or more cavities for accepting said indentations.

5. The bracket of claim 4, wherein said cavities are holes.

6. The bracket of claim 4, wherein when said cover is attached to said flanges, access to said second openings is blocked.

7. The bracket of claim 1, wherein said flanges and said top surface are formed from a single sheet of material.

8. A bracket for attaching a post to one or more fascia boards, said bracket comprising:
a substantially flat top surface, said top surface comprising one or more first openings sized to receive first fasteners for attachment to said post;
two substantially flat wings oriented substantially perpendicularly to each other, each of said wings comprising one or more second openings sized to receive second fasteners for attachment to said fascia boards;
at least three walls extending substantially perpendicularly from said top surface, wherein said wings are attached at a junction of two of said walls; and
a plurality of angled faces, wherein each of said angled faces extend from an edge of at least one of said walls and wherein said top surface, said walls, and said angled faces define a partially enclosed space.

9. The bracket of claim 8, further comprising a cover releasably attachable to said walls.

10. The bracket of claim 9, wherein said cover comprises a cover surface and two cover flanges extending substantially perpendicularly to said cover surface.

11. The bracket of claim 10, wherein each of said cover flanges comprises one or more indentations and wherein said walls comprises one or more cavities for accepting said indentations.

12. The bracket of claim 11, wherein said cavities are holes.

13. The bracket of claim 11, wherein when said cover is attached to said walls, access to said first openings is blocked.

14. The bracket of claim 8, further comprising two wing covers, said wing covers releasably attachable to said wings.

15. The bracket of claim 14, wherein each of said wing covers comprises a wing cover surface and a plurality of wing cover flanges extending substantially perpendicularly to said wing cover surface.

16. The bracket of claim 14, wherein when said wing covers are attached to said wings, access to said second openings is blocked.

17. The bracket of claim 8, wherein said second openings in one of said wings are offset in relative position from those said second openings in another of said wings, such that when said second fasteners are received in said second openings of both of said wings, said second fasteners do not interfere with each other.

18. The bracket of claim 8, wherein said plurality of angled faces is two angled faces.

19. The bracket of claim 8, wherein two of said walls comprise an angled edge.

20. A bracket for attaching a post to one or more fascia boards, said bracket comprising:
a substantially flat top surface, said top surface comprising one or more first openings sized to receive first fasteners for attachment to said post;
two substantially flat wings oriented substantially perpendicularly to each other, each of said wings comprising one or more second openings sized to receive second fasteners for attachment to said fascia boards;
at least three walls extending substantially perpendicularly from said top surface, wherein said wings are attached at a junction of two of said walls; and
a bottom, wherein said bottom comprises a plurality of angled faces and wherein said bottom extends from said walls,
wherein said top surface, said walls, and said bottom define a partially enclosed space.

21. The bracket of claim 20, further comprising a cover releasably attachable to said walls.

22. The bracket of claim 20, wherein said plurality of angled faces is two angled faces.

23. The bracket of claim 20, wherein at least two of said walls comprise an angled edge.

* * * * *